United States Patent [19]

Ross

[11] 4,273,605
[45] Jun. 16, 1981

[54] INTERNAL LINING AND SEALING OF HOLLOW DUCTS

[76] Inventor: Louis A. R. Ross, 54 Llanvair Dr., South Ascot, Berkshire, England

[21] Appl. No.: 540,386

[22] Filed: Jan. 13, 1975

[30] Foreign Application Priority Data

Jan. 21, 1974 [GB] United Kingdom ............... 2824/74
Sep. 4, 1974 [GB] United Kingdom ............. 38688/74

[51] Int. Cl.³ .......................................... B29C 17/07
[52] U.S. Cl. .................................. 156/286; 156/287; 156/294; 156/295; 156/423; 156/578
[58] Field of Search ............... 156/285, 286, 294, 295, 156/296, 323, 423, 497, 578, 287; 138/97; 29/234, 421; 61/72.2, 72.4; 264/90, 94

[56] References Cited

U.S. PATENT DOCUMENTS

| | | | |
|---|---|---|---|
| 2,312,993 | 3/1943 | Stephens | 156/286 |
| 2,570,259 | 10/1951 | McKinley | 156/286 |
| 2,608,501 | 8/1952 | Kimble | 156/286 |
| 2,664,373 | 12/1953 | Reilly | 156/286 |
| 2,794,758 | 6/1957 | Harper et al. | 156/286 |
| 3,494,813 | 2/1970 | Lawrence et al. | 156/294 |
| 3,513,051 | 5/1970 | Lichfield | 156/286 |
| 3,743,566 | 7/1973 | Louthan et al. | 156/296 |

FOREIGN PATENT DOCUMENTS 778034 7/1957 United Kingdom .
1340068 12/1973 United Kingdom .
136986 3/1961 U.S.S.R. .

Primary Examiner—Jerome W. Massie
Attorney, Agent, or Firm—Cushman, Darby & Cushman

[57] ABSTRACT

Disclosed is a method of lining a pipeline with a flexible tube by progressively inflating the interior of a flattened tube placed within the pipeline while simultaneously evacuating the space between the flattened tube and the pipeline interior wall.

2 Claims, 9 Drawing Figures

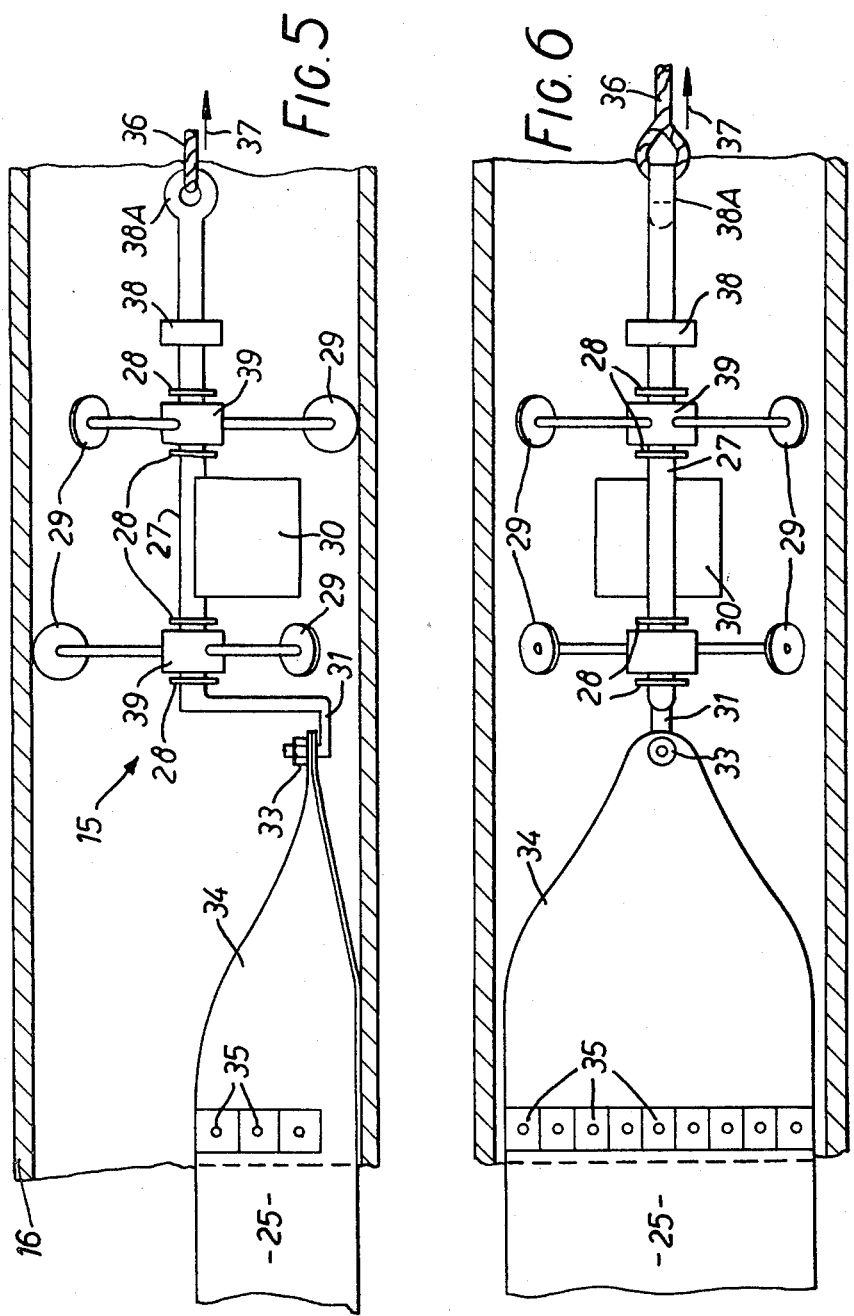

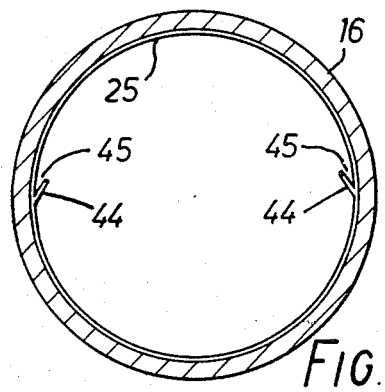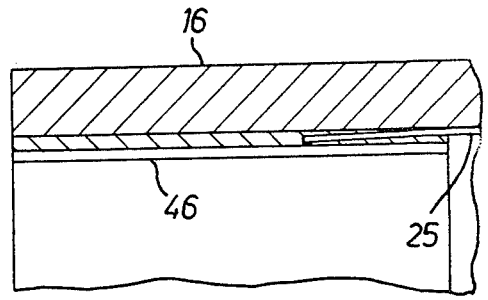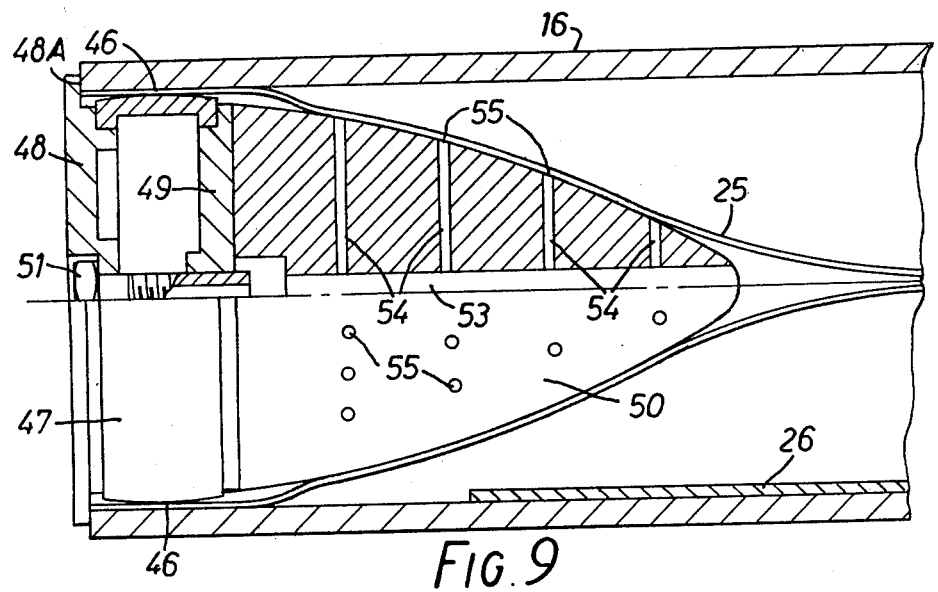

INTERNAL LINING AND SEALING OF HOLLOW DUCTS

This invention relates to methods and apparatus for the lining of an elongate cylindrical chamber with a flexible lining tube.

It has become apparent, particularly in dealing with gas mains, previously designed for carrying coal gas, but which now are required to carry natural gas, that there is a requirement for a simple and effective method of renovating the mains, in particular to prevent leakage therefrom.

Various methods are already known for lining such mains with a flexible lining tube, but none has so far proved itself in practice. In particular, it has been difficult to insert the lining tube into the main or pipeline without subjecting it to considerable strain, and also to the likelihood of abrasion and damage if it is simply pulled into the pipeline. Moreover, there has always been substantial difficulty in ensuring that the lining tube comes into intimate contact with the inside of the pipeline over its entire surface. It is found that there are usually pockets of air trapped between the lining tube and the pipeline, and these often lead to considerable troubles if water once again seeps into the pipeline and finds its way into these pockets. Accordingly, the invention provides a method of lining an elongate cylindrical chamber with a flexible lining tube, comprising the steps of pulling one end of the lining tube into one end of the chamber, and through the chamber until it reaches the other end thereof, said lining tube being supported on an underlay similarly pulled through the chamber; and subsequently inflating the tube.

This method has the obvious advantages that the underlay saves the lining tube itself from abrasion as it is towed into the chamber. Moreover, since the strain of pulling can be taken by the underlay, and the lining tube can simply rest upon the underlay without being required to take any strain, the lining tube can be spared the longitudinal stresses it would otherwise have to endure.

Further, the invention proposes a method of lining an elongate cylindrical chamber with a flexible lining tube, comprising the steps of introducing the tube into the chamber so that it lies throughout the length of the latter; sealing the ends of the tube circumferentially to the ends of the chamber; exhausting the space between the outside of the tube and the inside walls of the chamber; and allowing the tube to expand into contact with the said inside walls so that its lumen provides a flow path for delivering fluids along the pipeline.

Normally, it will be necessary for exhausting the same space, also to exhaust the tube itself. In this manner, the expansion of the tube can be totally controlled, and the expansion can be entirely uniform without the danger of trapping pockets of air against the inner wall of the chamber.

In order that the invention shall be clearly understood, various exemplary embodiments thereof will now be described, with reference to the accompanying drawings in which:

FIGS. 5 and 6 show side and plan views respectively of a towing carriage in a main;

FIG. 7 shows a view at the end of a main with a tube expanded into position;

FIG. 8 is an enlarged cross section of part of a tube-to-main end seal; and

FIG. 9 shows a longitudinal view of an expanding unit, complete with cone, in position in a main. The upper half of this view is cross-sectioned.

Figure 1:
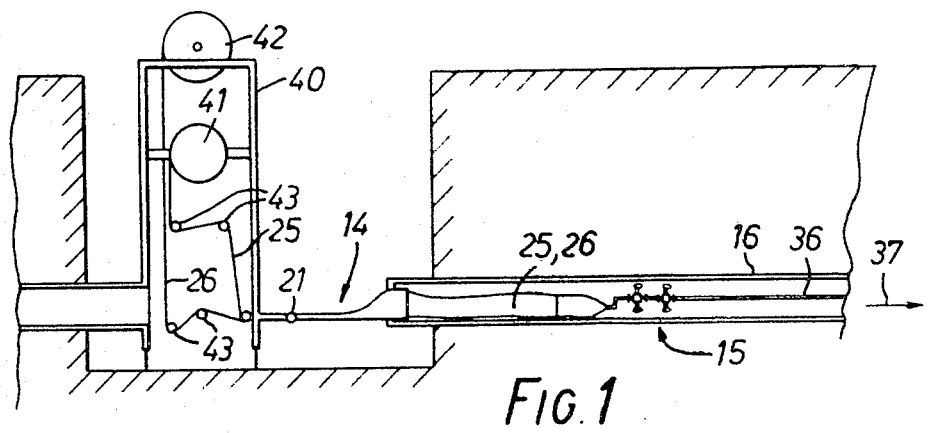
FIG. 1 shows a schematic sectional view through the end of a main laid in the ground, with apparatus for carrying out the invention.

Considering now FIG. 1, a framework 40 stands in a pit into which open the two ends of a severed gas main 16 which is to be lined by a flexible lining tube. The tube 25 in a flat state is dispensed from a reel 41. An underlay 26, in the form of a flat strip or another flattened tube, is dispensed from a reel 42. Both tube 25 and underlay 26 pass round idler rollers 43, through an adhesive applicator 14, 21 and are attached to a towing carriage 15. The carriage can be towed through the main in the direction 37 by means of a towing rope 36 pulled by a winch locating in a similar pit which may be located up to several hundred yards along the main.

In outline, the method of lining the main is to tow the end of the lining tube right through the main to the next access pit. The tube is supported by an equal length of underlay which both prevents rubbing of the tube on the lower walls of the main as it is pulled through, and accepts either all or a proportion of the towing forces. Before the lining tube enters the main, a layer of adhesive is dispensed onto its upper surface at a weir 21 as will be described later in detail. Once the lining tube is located throughout the length of this section of main, it is inflated, as will also be described later, bringing the adhesive on its upper surface into contact with the upper half of the inner surface of the main. It is held there by air pressure until the adhesive has secured the lining in position. The underlay may be withdrawn by pulling, or simply left in position in the main.

Figure 2:
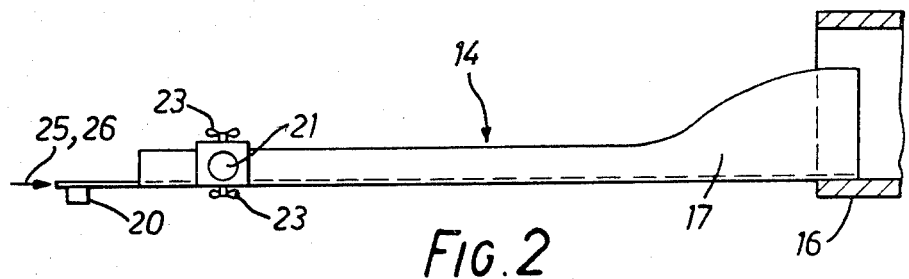
FIGS. 2, 3 and 4 show respectively side, plan and end views of apparatus for applying adhesive.
Figure 3:
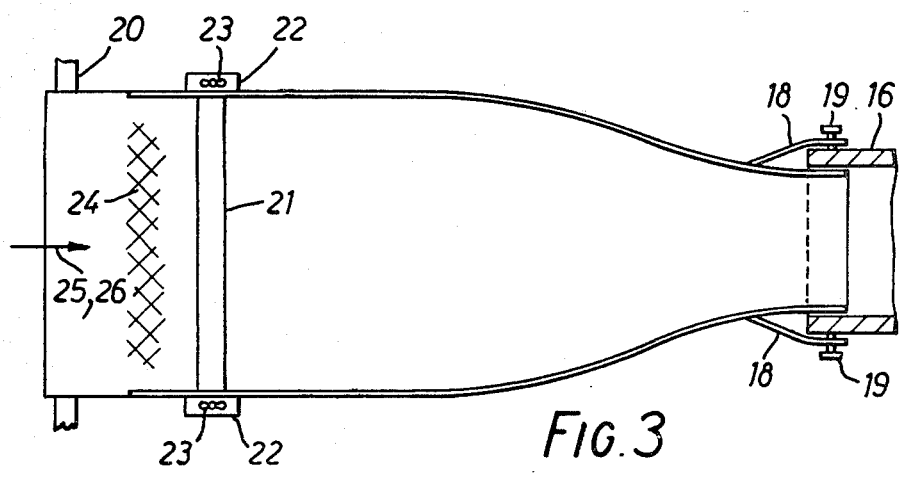
Figure 4:
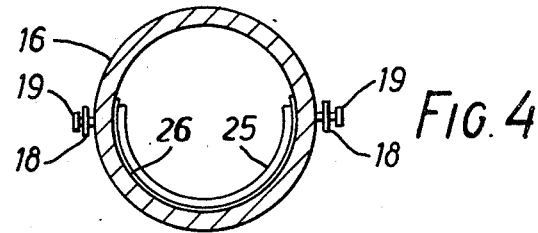

Turning now to FIGS. 2, 3 and 4, the adhesive applicator 14 comprises a tray 17 which is initially flat and curves smoothly into a half-cylinder. The half-cylinder end is fixed in the open end of the main 16 which is to be lined by brackets 18 and screws 19. The flat end of the tray 17 is supported on a horizontal cross member 20 of the frame 40 shown in FIG. 1. Over the flat portion of the tray 17 is a roller 21 forming a weir for controlling the thickness of the adhesive layer applied to the tube. The roller 21 is supported in brackets 22, and is adjustable in height by means of screws 23. The flat tube 25 and the underlay 26 pass together onto the flat end of the tray 17 and beneath the roller 21. At the other end of the tray, the sides of the tube and underlay are curved upwardly and enter the main 16 in the configuration of a half-cylinder. Adhesive 24 is dispensed by any convenient means onto the upper surface of the flat tube 25, the amount actually passing into the main being controlled by adjustment of the roller 21.

The adhesive required for this method of operation must usually be fairly viscous and is preferably a "two-part" adhesive of the epoxy or polyester resin groups of adhesive materials. The adhesive may contain a filler material, such as marble dust, which will tend to fill up small surface irregularities in the main.

The application of adhesive to the upper surface of the lining tube is not the only method of proceding. By contrast, the main may be initially sprayed internally with an adhesive, to which the lining tube will then adhere after expansion. In that case, the adhesive will be required to have a low initial viscosity and must remain tacky until the expansion of the lining tube. For this purpose, an adhesive employing a natural or synthetic rubber with additive chemical constituents may be suitable.

From the foregoing, it is apparent that the main adhesion of the lining tube will be over the upper half-cylinder of the main. In practice, it may not be important for the lining tube to adhere to the lower half of the main. However, in those circumstances, if the interior pressure in the main is reduced later during operation, it is possible that ground water may enter the main via leakage points covered over by the lining tube. If this happens, the lower part of the lining tube may be caused to float on a stream of water flowing beneath it. This will not normally be harmful if only small amounts of water enter, but there are dangers if the lining tube becomes displaced too much. If that is likely, it is important to ensure that the tube becomes adhered to the inner surface of the main around the whole circumference.

A preferred method of achieving this is to dispense onto the top surface of the lining tube a greater volume of adhesive than would be required only for sticking the upper surface of the tube. Then, when the tube is subjected to internal pressure to expand it, the excess adhesive will flow downwards and around the lower half of the tube. It has been found in practice that not only will the adhesive flow between the tube and the underlay, but also between the underlay and the inner surface of the main. Thus, the underlay and the lower half of the tube are adhered together and to the main. In fact, satisfactory results are achieved by employing twice the quantity of adhesive which would otherwise be required.

It is found that the flow of the adhesive is assisted materially by the exhaustion of air from the space between the tube and the inner wall of the main, simultaneously with the inflation of the tube.

As an alternative to the above, it is possible to employ a porous or perforated underlay and to dispense an adhesive onto the upper surface of the underlay before it enters the main. Thus, when the tube is fully in position and is inflated, the internal pressure exerted by the tube tends to squeeze the adhesive between it and the underlay through the underlay, thus achieving full adherence of the tube and the underlay to the wall of the main. In this case, the underlay may conveniently be a woven fabric. The adhesive used should not have too little viscosity, otherwise it may leak through the underlay while the latter is still being pulled through the main.

The towing carriage 15 is illustrated in FIGS. 5 and 6. It consists of sets of wheels to which are connected a towing plate 34. The latter has a semi-cylindrical cross-section at its left-hand end, and the lining tube and underlay are clamped to it by means of clamps 35. The forward (right-hand end) of the towing plate 34 is pivoted on a U-shaped bracket 31 and held by a nut 33. The bracket 31 is connected to a central shaft 27 which passes axially through two sets of wheels 29. The wheels are connected to central bosses 39 which can rotate about the shaft 27, but are restricted from axial movement by collars 28. A weight 30 attached to the shaft 27 ensures that the U-bracket remains in a vertical plane.

The carriage is towed through the main 16 by a towing rope 36 which is attached to a ring 38a connected via a thrust bearing 38 to the shaft 27. The bearing 38 permits the transfer only of tensile forces, so that twisting of the rope cannot cause rotation of the shaft 27.

By this means, it is ensured that the towing plate 34 remains in the lower half of the main, and does not rotate. The lining tube and its underlay are therefore towed through the main without being twisted. If desired, only the underlay may be attached to the clamps 35, the lining tube being taped to the underlay so that it does not have to undergo any tensile stress.

Once the lining tube and the underlay are in position, it is then necessary to expand the former by the production of a pressure differential so that the outer surface of the tube comes into intimate contact with the inner surface of the main.

It is found that it is not sufficient simply to inject air under pressure into the lining tube. Even when vents are left in the wall of the main, it is seldom possible to achieve a satisfactory escape of the air within the main, and pockets form which are very difficult to disperse and which in extreme cases lead to the formation of a series of ballooned sections of lining tube, separated by constricted lengths. This can lead to the lining tube being subject to bursting stresses, and it becomes very difficult to achieve satisfactory bonding of the tube to the wall of the main.

In order to overcome this problem, it has been found advisable to evacuate the space between the lining tube and the main before the tube is allowed to expand to any extent. Once in position, therefore, the first step is to seal the ends of the lining tube circumferentially to the ends of the main. This can conveniently be done by plugs inserted into the lining tube at its ends. Suitable plugs will be described later. It is necessary also to provide bores in the wall of the main to which a vacuum pump may be connected.

Preferably, before the main itself is evacuated, any small amount of air within the lining tube itself is first exhausted. There are a number of reasons for this. The first is that it will disclose any leak in the lining tube. The second is that if there is any air within the tube when the main is evacuated, this air will start expanding, possibly prematurely, as soon as its pressure becomes greater than the pressure within the main but externally of the lining tube.

Once the tube is evacuated and its ends capped off, the main can be exhausted. The degree of the vacuum is monitored, and when it reaches approximately 20 inches of mercury or greater (that is upwards of minus ten pounds per square inch gauge pressure), a valve fitted to the closure cap at that end of the main furthest away from the end connected to the vacuum pump is opened. This can be controlled so that the expansion of the lining tube occurs in an even manner. The air flow into the tube should not exceed the rate of air extraction from the main. Eventually, the pressure within the tube will reach atmospheric and the tube will then be applied evenly over the whole inner surface of the main, and without trapping bubbles of air. If desired, the pressure in the tube may be increased slightly above atmospheric in order to improve adhesion and to drive out through suitable vent holes any air which may, in fact, have become trapped.

A test pressure may be immediately applied to the now lined main, the pressure thus aiding the adhesion of the lining tube.

The expanding unit used at the ends of the main will now be described with reference to FIG. 9. The unit is shown in position in the end of the main 16 and positioned to hold a lining tube 25. The tube has been sealed into the end of the main by a ring 46, in a manner yet to be described. The unit has two discs 48, 49 made of metal, the disc 48 having a flange 48a which abuts the axial end of the main. Between the two discs is an expansible rubber ring 47. The two discs 48,49 are held together by a bolt 51 which passes through the outer disc 48 and is received in a threaded bore 52 in the inner disc 49.

Attached to the forward surface of the disc 49 is a cone 50 of rubber, plastics material or metal, the cone having a length about twice its diameter. A large number of ducts 53,54 lie within the cone and have apertures 55 on its surface. The ducts communicate through further holes in the plates 48,49 or through the bore 52 with the outer surface of the disc 48.

Rotation of the bolt 51 will draw the two discs 48,49 together and correspondingly expand the ring 47. The latter is then brought into compressive engagement with the rubber strip 46 holding the end of the tube 25. The purpose of the expanding unit is two-fold. Firstly, it serves to ensure that the end of the tube is not torn from its anchorage at the end of the main when the tube 25 is being evacuated or expanded. Secondly, it ensures that the first section of the tube 25 is evenly stressed over its whole circumference at those times and prevents excessive stresses arising in the wall of the tube due to the pressure differentials.

It would, if course, be possible to employ a pressure fluid expansion system for the ring 47.

An expanding unit is required at both ends of the main.

As seen in FIG. 7, it is of no consequence if the lining tube has a diameter which is larger than the internal diameter of the main 16. Once the tube is expanded into position, the excess tube will simply form folds or ridges extending along the length of the main. At the ends of the main, it is convenient to manipulate the excess into one or two neat folds 44 which can then be flattened against the inner surface and adhered flat by the application of adhesive at the points 45.

FIG. 8 shows the very end of the lining tube 25, which lies a short distance within the end of the main 16. The purpose of this is to allow a complete bonding and encapsulation of the severed end of the tube 25 by means of resin or adhesive. Further, in order to strengthen the attachment, a ring of a flat, for example rubber, strip 46 is positioned within the end of the main 16 so that it overlaps the severed end of the tube 25. Furthermore, the strip 46 may include a metallic or other stiff supporting ring if greater strength is required.

Whatever methods are adopted, it is essential that the severed end of the tube 25 should be completely secured to the main 16 since otherwise it will be difficult to carry out the step of evacuating the space between the tube 25 and the main 16 before the tube is expanded.

In order to ensure that bonding at the end of the main is completely effective, it is preferred that the internal surface of the main should be completely cleaned down to the bare metal, before the adhesive or bonding resin is applied. While the resin or adhesive is setting, an expanded pressure bag is preferably inserted within the end of the main to maintain the strip 46 firmly in position.

Once the lining tube has been set in position and stuck, it may still be that upon pressure testing it is found that the main is still leaking. Certain leakage rates may be tolerated according to the requirements, but if the leakage rate is too great, and the adhesive has not cured, it may be possible to remove the lining tube just inserted. This is best done by passing a rope through the main, attaching the lining tube to it at one end of the main and then pulling the rope from the other end. This will pull the lining through itself, progressively stripping it from the wall of the main as it goes. If the adhesive has dried or cured, then it may be necessary to repeat to entire lining process so as to place a second lining tube within the first.

Previous discussion has assumed that the lining tube is not required to form a rigid structure of itself. If this is required, structural strength of either upper or lower or both halves of the tube can be achieved by employing a hard setting adhesive. Additionally, the adhesive may be given bulk by the addition of marble or stone dust. Furthermore, a sandwich of hardenable adhesive may be formed between two tubes lying one within the other, or between a tube and an underlay and/or an overlay. Thus, for example, a triple sandwich comprising an overlay, a layer of adhesive, a flattened lining tube, a second layer of adhesive, and an underlay may be fed into a main by the methods described and the tube then expanded. If desired, a layer or layers of thin absorbent foam or sponge-like plastics material may be introduced between the lining tube and the under-or over-lay. If sufficient adhesive is applied, the foam plastic will be thoroughly impregnated and will form a suitably bulky and rigid structure when the adhesive sets.

The final problem to be considered is the connections which are tapped off the main at intervals. It is obviously simpler if the methods and apparatus according to the invention are used on a main having few, if any, such connections. If they exist, however, they were usually originally made by drilling and tapping the wall of the main and for the duration of the treatment, it is necessary to disconnect them and to plug the hole with a screwed plug. In some mains, the connections are in the side, and these are best completely dismantled and plugged off permanently. A new tapping can then be made in the top of the main, which is the best place since it is over that area that the lining tube is most certainly adhered to the inner wall of the tube.

It must be ensured that around the edge of a hole made in the lining tube for the purpose of such a connection the lining tube is absolutely stuck to the main. If this is not the case, it is possible for gas in the main to leak through that part and along between the lining tube and the inner surface of the main until it finds one of the original leaks. The method of securing the connection is therefore at its simplest preferably as follows: Cleaning the wall of the main for a small distance around the connection point before the insertion of the lining tube, sealing the connection point during the lining process and subsequently removing the sealing plug, inserting an adhesive through the connection point between the lining tube and the main around the connection point where it has been cleaned, and only then cutting a hole in the expanded lining tube which is substantially coterminous with the connection point.

In carrying out this method, the initial cleaning can usually be done by hand. After the lining tube has been expanded into position and the blanking plug removed, the lining tube can be pushed by finger pressure slightly away from the circumference of the connection point and the adhesive used for the length of the lining tube should then be removed by hand using a solvent applied to a small cloth. A hard setting adhesive is injected onto the still intact surface of the lining tube possibly using a small nozzle. A suitable adhesive for this purpose is a high viscosity one-part fluid of the range known chemical cyanoacrylate. This adhesive is non-shrinking and quick setting. The result is the production of a hard circle, extending laterally of the connection point, bonding the lining tube at the circumference of the connection point. After the adhesive has set, a circle is cut out of the lining tube to gain access to the main. The edge of the adhesive where the lining tube has been cut must be cut back and smoothed so that when a connection pipe is screwed into the connection point, there is no danger of it catching on the ring of adhesive and detaching it from the wall of the main. For extra safety, a small annulus of a flexible material having a diameter slightly greater than the connection point may be inserted through the hole and pulled upwardly inside the lining tube.

The methods and apparatus described are, of course, applicable to any elongate cylindrical chamber, but exhibit most advantage where very long chambers such as pipelines are treated.

I claim:

1. A method for in situ lining of the interior sidewall of a long, buried length of pipeline with an imperforate, flexible lining tube, comprising the steps of:
   (a) introducing an imperforate flexible lining tube into the length of pipeline in a collapsed state so that it lies throughout the length of said interior sidewall of said length of pipeline, step (a) being conducted by superimposing said tube in a collapsed state, upon an underlay and pulling a leading portion of this composite along through the length of pipeline, until said collapsed tube lies upon the underlay throughout said length of pipeline with approximately half of the exterior surface thereof presented upwardly;
   (b) sealing the ends of the tube perimetrically to said length of pipeline at both ends of said length of pipeline, but providing an exhaust port from the space between the outside of the tube and said interior sidewall at one said end and an inflation port into the lumen of the tube at the opposite said end of said pipeline length;
   (c) partially exhausting said space between the outside of the tube and said interior sidewall;
   (d) progressively expanding the tube into intimate contact with said length of pipeline in an even manner, by:
      (i) continuing to conduct step (c) upon said space, by drawing a partial vacuum via said exhaust port; and simultaneously
      (ii) admitting an inflation gas such as air into said lumen through said inflation port;
   further comprising a step of applying an adhesive upon said upwardly presented half of the collapsed tube before conducting step (b), the amount of distribution of this adhesive as applied being at least sufficient to, as a consequence of conducting step (d) and setting of said adhesive, approximately the upper half of exterior of the tube is facially secured to about the upper half of the interior sidewall of the length of pipeline.

2. The method of claim 1 wherein:
the adhesive viscosity is such that and the underlay is made of material such that the adhesive flows angularly of the interior sidewall of the length of pipeline while step (d) is conducted, and sufficient adhesive is applied during said adhesive applying step, that upon the completion of step (d) the exterior of the tube is facially secured to the interior sidewall of the length of pipeline over substantially the full respective circumferences thereof.

* * * * *